(12) United States Patent
Takao et al.

(10) Patent No.: US 7,823,679 B2
(45) Date of Patent: Nov. 2, 2010

(54) SEATBELT APPARATUS

(75) Inventors: Masato Takao, Minato-ku (JP); Koji Tanaka, Minato-ku (JP)

(73) Assignee: Takata Corporation, Tokyo (JP)

( * ) Notice: Subject to any disclaimer, the term of this patent is extended or adjusted under 35 U.S.C. 154(b) by 323 days.

(21) Appl. No.: 12/010,296

(22) Filed: Jan. 23, 2008

(65) Prior Publication Data

US 2008/0174098 A1   Jul. 24, 2008

(30) Foreign Application Priority Data

Jan. 24, 2007   (JP)   ............................. 2007-014369

(51) Int. Cl.
*B60R 22/343* (2006.01)

(52) U.S. Cl. .................. 180/268; 280/807; 297/474; 297/477; 242/390.8; 242/390.9

(58) Field of Classification Search ................. 180/268; 280/807; 242/374, 384.1, 390.8, 390.9; 297/474–477
See application file for complete search history.

(56) References Cited

U.S. PATENT DOCUMENTS

| 6,827,308 | B2 * | 12/2004 | Fujii et al. ................ 242/390.9 |
| 7,240,923 | B2 | 7/2007 | Tanaka et al. |
| 2002/0189880 | A1 * | 12/2002 | Tanaka et al. ................ 180/268 |
| 2003/0173131 | A1 * | 9/2003 | Midorikawa et al. ......... 180/268 |
| 2005/0082410 | A1 * | 4/2005 | Tanaka et al. ............. 242/390.8 |
| 2005/0098997 | A1 * | 5/2005 | Tanaka et al. ................ 280/807 |
| 2005/0146128 | A1 * | 7/2005 | Midorikawa et al. ......... 280/807 |
| 2006/0097096 | A1 * | 5/2006 | Heckmayr ................... 242/374 |
| 2006/0220368 | A1 * | 10/2006 | Takao et al. ............... 280/801.1 |
| 2006/0231664 | A1 * | 10/2006 | Takao et al. .................. 242/374 |
| 2006/0237570 | A1 * | 10/2006 | Takao et al. .................. 242/374 |
| 2007/0114775 | A1 * | 5/2007 | Inuzuka et al. .............. 280/807 |

FOREIGN PATENT DOCUMENTS

| JP | 2001-347923 | 12/2001 |
| JP | 2005-28970 | 2/2005 |
| JP | 2005-42775 | 2/2005 |
| JP | 2005-145086 | 6/2005 |
| JP | 2005-280497 | 10/2005 |
| JP | 2006-315683 | 11/2006 |

* cited by examiner

*Primary Examiner*—Ruth Ilan
(74) *Attorney, Agent, or Firm*—Foley & Lardner LLP

(57) ABSTRACT

A method of controlling a motorized retractor includes a spool onto which a webbing belt for restraining an occupant is wound, a motor operated according to a predetermined signal, and a clutch mechanism enabling transmission of power from the motor to the spool. When cancelling power transmission of the clutch mechanism by the operation of the motor, the rotating speed or the driving time period of the motor is varied according to the load on the clutch mechanism.

20 Claims, 7 Drawing Sheets (A)

(B)

(A)

(B)

SEATBELT APPARATUS

BACKGROUND

The present invention relates to a seat belt apparatus for a vehicle.

A seat belt apparatus for restraining an occupant seated in a vehicle seat with a webbing belt may have a long band shape including a retractor (e.g., a winding device) disposed on the vehicle seat or a vehicle body. The retractor includes a spool (e.g., a winding shaft) onto which the webbing belt is wound up and a spring for biasing the spool in a winding direction of the webbing belt.

A retractor may have a motor for restraining an occupant's body during sudden turning or sudden braking and for removing slack of the webbing belt relative to the position of the occupant. The driving force of the motor is transmitted to a spool to rotate the spool by a predetermined amount in the winding direction of the webbing belt to temporarily increase the tension on the webbing belt. If the spool and the driving shaft of the motor are always mechanically connected to each other, the normal winding and unwinding actions of the webbing belt may be affected causing unnecessary load on the motor. To avoid an unnecessary load, a clutch mechanism is usually arranged between the driving shaft of the motor and the spool.

SUMMARY

One embodiment of the invention relates to a method of controlling a motorized retractor that includes a spool onto which a webbing belt for restraining an occupant is wound, a motor operated according to a predetermined signal, and a clutch mechanism enabling transmission of power from the motor to the spool. When cancelling power transmission of the clutch mechanism by the operation of the motor, the rotating speed or the driving time period of the motor is varied according to the load on the clutch mechanism.

DETAILED DESCRIPTION

Figure 6:
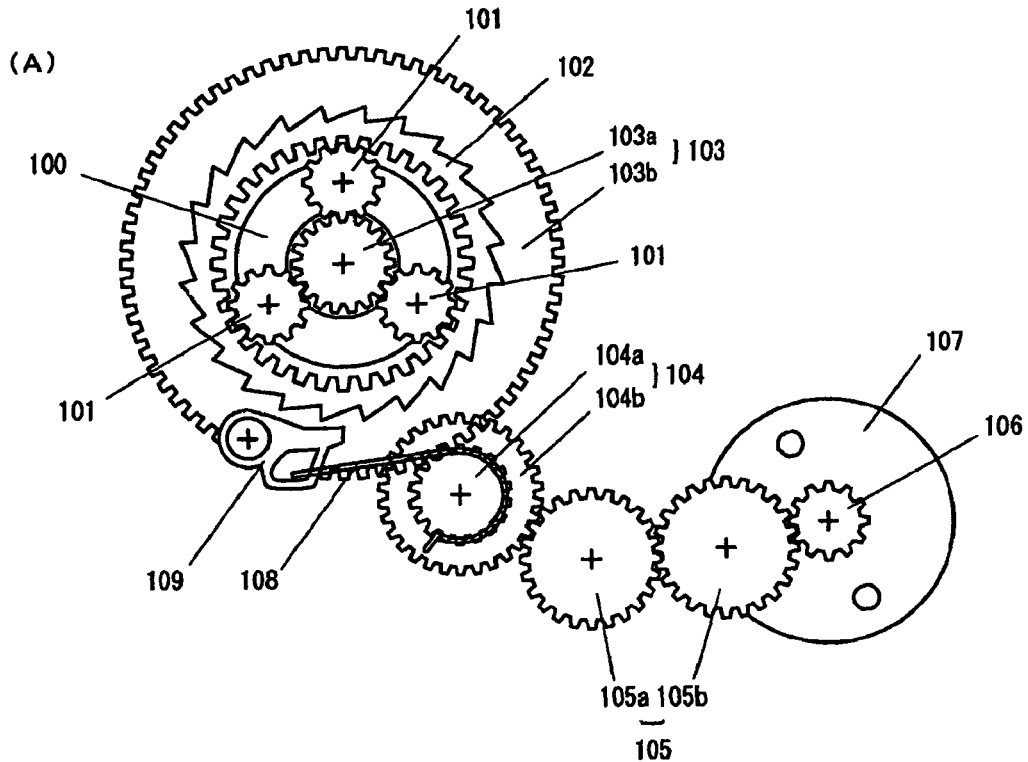
FIG. 6(A) is an illustration showing a power transmission mechanism of the motorized retractor of FIG. 1 where the clutch is disengaged according to an exemplary embodiment.
FIG. 6(B) is an illustration showing a power transmission mechanism of the motorized retractor of FIG. 1 where the clutch is engaged according to an exemplary embodiment.
Figure 6:
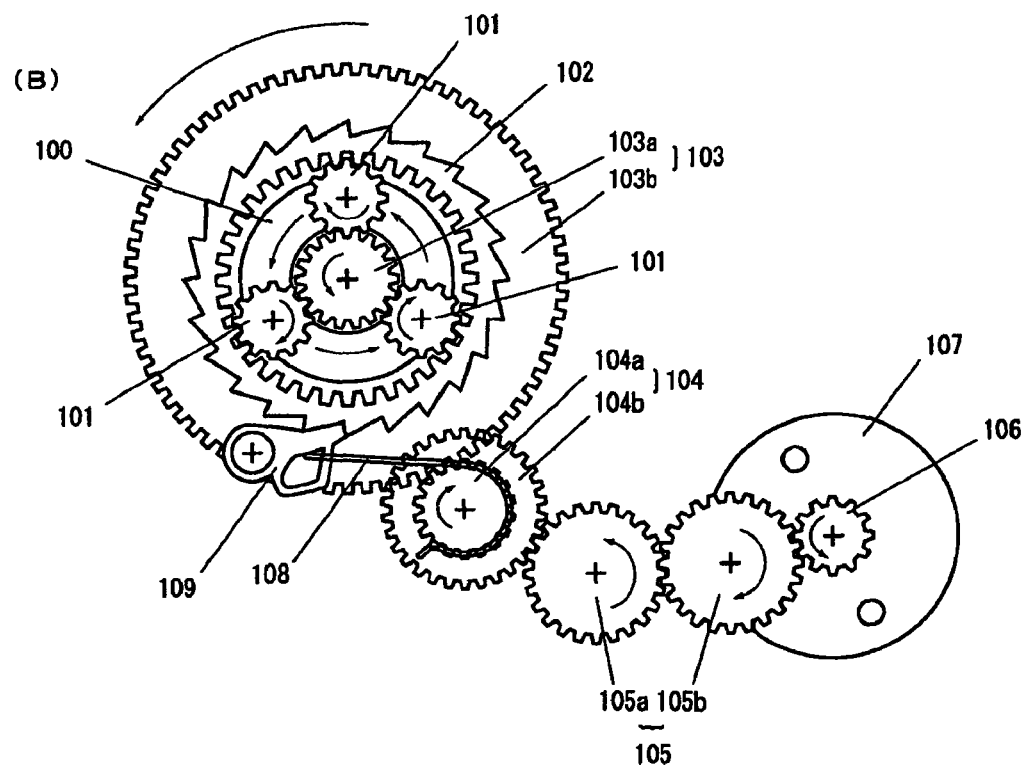

FIGS. 6(A) and 6(B) are illustrations showing a power transmission mechanism of a motorized retractor. FIG. 6(A) shows a state where the clutch is disengaged and FIG. 6(B) shows a state where the clutch is engaged. The power transmission mechanism of the motorized retractor shown in FIGS. 6(A) and 6(B) includes a carrier 100 that is coaxially connected to the spool, three planetary gears 101 rotatably supported by the carrier 100, an internal gear 102 having internal teeth meshing with the planetary gears 101, a sun gear 103, a clutch gear 104, idle gears 105 that mesh with the idle gears 105, a motor gear 106, a motor 107 for driving the motor gear 106, a clutch spring 108 that is engaged with the clutch gear 104, and a pawl 109 that can be engaged with or disengaged from external teeth of the internal gear 102 according to the pivotal movement of the clutch spring 108.

Sun gear 103 includes a small-diameter first sun gear 103a that is coaxially and rotatably connected to the carrier 100 and meshes with the three planetary gears 101 and a large-diameter second sun gear 103b that rotates together with the first sun gear 103a. Clutch gear 104 includes a first clutch gear 104a that meshes with the second sun gear 103b and a second clutch gear 104b that rotates together with the first clutch gear 104a. Idle gears 105 include a first idle gear 105a that meshes with the second clutch gear 104b and a second idle gear 105b that meshes with the first idle gear 105a. Motor gear 106 meshes with the second idle gear 105b.

Shown in FIG. 6(A) is a state where the clutch is disengaged, that is, the pawl 109 is not engaged with any one of the external teeth of the internal gear 102. Therefore, the internal gear 102 is allowed to be freely rotated. The carrier 100 is rotated in conjunction with the rotation of the spool when the webbing belt is normally wound or unwound. The three planetary gears 101 move about the axis of the spool so that the internal gear 102, which meshes with the planetary gears 101, is also rotated. As a result, the spool can be rotated without unnecessary load.

Shown in FIG. 6(B) is a state where the clutch is engaged, that is, the pawl 109 is engaged with one of the external teeth of the internal gear 102. The internal gear 102 is blocked from rotating in the clockwise direction. As the motor 107 is operated to rotate the motor gear 106 in the illustrated counter-clockwise direction, the clutch gear 104 is rotated in the illustrated clockwise direction via the idle gears 105. According to the rotation of the clutch gear 104, the second sun gear 103b that meshes with the first clutch gear 104a is rotated in the illustrated counter-clockwise direction and the first sun gear 103a is also rotated in the counter-clockwise direction. Power is transmitted to the planetary gears 101 via the first sun gear 103a. The planetary gears 101 are rotated in the illustrated clockwise direction and transmit the driving force in the clockwise direction to the internal gear 102. However, since the internal gear 102 is blocked from rotating in the clockwise direction, the planetary gears 101 move in the counter-clockwise direction around the axis of the spool so that the carrier 100 is also rotated in the counter-clockwise direction. As a result, the driving force of the motor 107 is transmitted to the carrier 100 (e.g., the spool) to wind the webbing belt.

In the power transmission mechanism shown in FIGS. 6(A) and 6(B), the clutch gear 104, the clutch spring 108, and the pawl 109 compose the clutch mechanism. In the clutch mechanism the ON/OFF state of the clutch (i.e., engagement/disengagement of the pawl 109) is switched by operating the motor 107 to rotate in a normal direction (e.g., the counter-clockwise direction) or to rotate in a reverse direction (e.g., the clockwise direction). As the motor 107 is operated to rotate in the normal direction, the clutch gear 104 is rotated in the clockwise direction to pivotally move the clutch spring 108 in the clockwise direction. The pivotal movement of the clutch spring 108 in the clockwise direction engages the pawl 109 with one of the external teeth of the internal gear 102 to engage the clutch. As the motor 107 is operated to rotate in the reverse direction, the clutch spring 108 is pivotally moved in the counter-clockwise direction to disengage the pawl 109 from the external teeth of the internal gear 102, thereby disengaging the clutch.

According to other exemplary embodiments, the motorized retractor may include a clutch mechanism of various other designs for example as described in JP-A-2001-347923, JP-A-2005-42775, JP-A-2005-28970, and JP-A-2005-145086, which are all incorporated by reference in their entirety.

Figure 7:
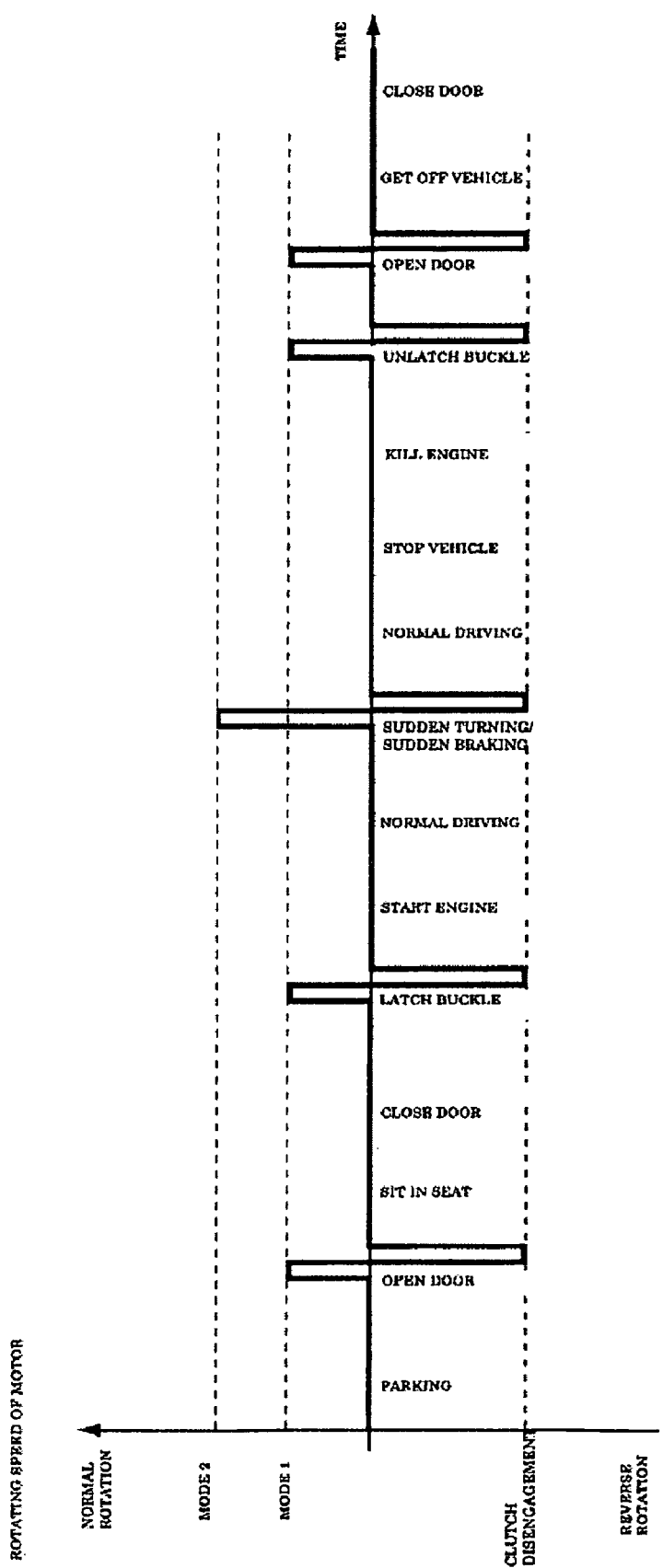
FIG. 7 is a diagram showing operating conditions of a motor of the motorized retractor of FIG. 1 according to an exemplary embodiment.

The motor 107 of the motorized retractor is connected to an ECU (electronic control unit) and may be operated according to signals received from the ECU, for example to change between a parking state and a driving state. FIG. 7 is a diagram showing example operation conditions of a motor of the motorized retractor in which the ordinate indicates the rotating speed of the motor and the abscissa indicates time. According to one exemplary embodiment, when the motorized retractor changes states from a parking state through a driving state and back to the parking state again, the motor 107 of the motorized retractor rotates when opening a door, when latching a buckle, when suddenly turning/suddenly braking, when unlatching the buckle, and when opening the door again. When opening the door, latching the buckle, unlatching the buckle, and opening the door again, the motor 107 rotates in a mode 1 with low rotating speed. When suddenly turning/suddenly braking, the motor 107 rotates in a mode 2 with a higher rotating speed. In mode 1, the rotating speed of the motor 107 may be lower because the mode is set for removing slack of the webbing belt relative to the occupant (e.g., when latching the buckle) and for removing slack caused during the storage of the webbing belt (e.g., when opening the door, when unlatching the buckle, etc.). In mode 2, a higher rotating speed of the motor 107 may reduce the possibility of or prevent the webbing belt from being withdrawn so as to more securely restrain the occupant in a seat.

After reducing the slack of the webbing belt in mode 1 or when cancelling the restraint of the occupant in mode 2, the system may stop the motor 107 and disengage the clutch. If the clutch remains in the engaged state, the occupant may be unable to normally unwind or wind the webbing belt. To disengage the clutch, the motor 107 is generally operated to rotate in the reverse direction to rotate the clutch spring 108 in the counter-clockwise direction so as to cancel the engagement between the pawl 109 and the external teeth of the internal gear 102 (see FIGS. 6(A) and 6(B)). As shown in FIG. 7, the clutch disengaging process is conducted with the same control method for both mode 1 and mode 2. Regardless of the mode the clutch disengaging process may be conducted by controlling the motor 107 to rotate in the reverse direction at a similar rotating speed for a similar time period.

For example, according to the clutch mechanism shown in FIGS. 6(A), 6(B), when the motor 107 is operated to rotate in the reverse direction for disengaging the clutch, the holding force of the power transmission mechanism may be reduced. In mode 2, as high tension acts on the webbing belt in the unwinding direction, high torque in the reverse direction acts on the carrier 100 (e.g., the spool). The carrier 100 is also rotated in the reverse direction according to the reverse rotation of the motor 107 so that the rotating speed and time period are enough to disengage the clutch.

The reverse rotation of the motor 107 for disengaging the clutch may cause operating noise and make the occupant uncomfortable. Operating noise may be reduced by setting a clutch disengaging current to be smaller than an unlocking current when unlocking and disengaging the clutch after avoiding an emergency state as described in JP-A-2005-42775. However, this control method may not work as well when operating in mode 1 since the operation frequency of mode 1 is higher than the operation frequency of mode 2 and the engagement between the pawl 109 and the external teeth of the internal gear 102 in mode 1 is weaker than in mode 2 (the load on the clutching mechanism in mode 1 is lower than that in mode 2).

The present invention relates to a method of controlling a motorized retractor, a motorized retractor that includes a motor for winding a webbing belt for a vehicle, and to a seat belt apparatus that includes a motorized retractor. More particularly, the invention relates to a method of controlling a motorized retractor to reduce operating noise of a motor during disengagement of a clutch, located between the motor and a power transmission mechanism for a spool, from the motorized retractor and to a seat belt apparatus using the motorized retractor.

According to an exemplary embodiment a motorized retractor includes a spool onto which a webbing belt for restraining an occupant is wound, a motor which is operated according to a predetermined signal, and a clutch mechanism enabling transmission of power from the motor to the spool. A method of controlling the motorized retractor includes cancelling power transmission of the clutch mechanism by operating the motor. The rotating speed and/or the driving time period of the motor are varied according to the load on the clutch mechanism.

If the load on the clutch mechanism is lower than a predetermined value, the rotating speed of the motor may be lowered, the driving time period of the motor may be shortened, and/or the rotating speed of the motor may be lowered. The driving time period of the motor may be shorter than if the load on the clutch mechanism is higher than the predetermined value. If the load on the clutch mechanism is lower than the predetermined value, the operation of the motor is in a first mode to remove a slack of the webbing belt. If the load on the clutch mechanism is higher than the predetermined value the operation of the motor is in a second mode to restrain an occupant in the event of emergency such as sudden turning or sudden braking. The rotational speed of the motor may be varied gradually, in steps, or both gradually and in steps.

According to an exemplary embodiment, a motorized retractor includes a spool onto which a webbing belt for restraining an occupant is wound, a motor which is operated according to a predetermined signal, a clutch mechanism enabling transmission of power from the motor to the spool, and a control unit for controlling the operation of the motor. When cancelling power transmission of the clutch mechanism by operation of the motor, the rotating speed and/or the driving time period of the motor may be varied according to the load on the clutch mechanism.

In the control unit, if the load on the clutch mechanism is lower than a predetermined value, the rotating speed of the motor may be lowered, the driving time period of the motor may be shortened, and the rotating speed of the motor may be lowered. The driving time period of the motor may be shorter than if the load on the clutch mechanism is higher than the predetermined value. If the load on the clutch mechanism is lower than the predetermined value operation of the motor is in a first mode to remove a slack of the webbing belt. If the load on the clutch mechanism is higher than the predetermined value, the operation of the motor is in a second mode to restrain an occupant in the event of emergency such as sudden turning or sudden braking. The rotational speed of the motor may be varied gradually, in steps, or both gradually and in steps.

According to an exemplary embodiment, a seat belt apparatus includes a webbing belt for restraining an occupant, a motorized retractor for winding the webbing belt such that the webbing belt is allowed to be withdrawn, a tongue slidably supported by the webbing belt, and a buckle fixed to a vehicle body portion and capable of latching with the tongue. The motorized retractor may be any motorized retractor capable of conducting the control method described above.

When cancelling power transmission of the clutch mechanism by the operation of the motor of the motorized retractor, the rotating speed of the motor can be lowered and/or the driving time period can be shortened in case of low tension on the webbing belt and the rotating speed of the motor can be increased and/or the driving time period can be lengthened in case of high tension on the webbing belt. The rotating speed and/or the driving time period of the motor when the tension on the webbing belt is low (for example, the rotating speed of the motor before disengaging the clutch is low) can be reduced as compared to a conventional control method reducing the operating noise of the motor.

By lowering the rotating speed of the motor, the operating noise of the motor itself can be reduced. By shortening the driving time period of the motor, the time period during which the operating noise is generated from the motor can be shortened. By lowering the rotating speed of the motor as well as shortening the driving time period of the motor, the operating noise of the motor can be reduced and the time period during which the operating noise is generated from the motor can be shortened.

By differentiating the first mode of operation from the second mode of operation and lowering the rotating speed of the motor and/or shortening the driving time period of the motor when disengaging the clutch in the first mode, the operating noise of the motor in the first mode can be reduced. Since the first mode may be more frequent than the second mode during driving of a vehicle, the operating noise may be greatly reduced, significantly reducing the uncomfortable feeling of the occupant.

By varying the rotating speed of the motor in the reverse direction gradually, in steps, or both gradually and in steps, operational control of the motor may be increased and due to the relationship between the rotating speed and the driving time period of the motor, the load on the clutch mechanism and the operating noise felt by the occupant may be reduced.

Figure 1:
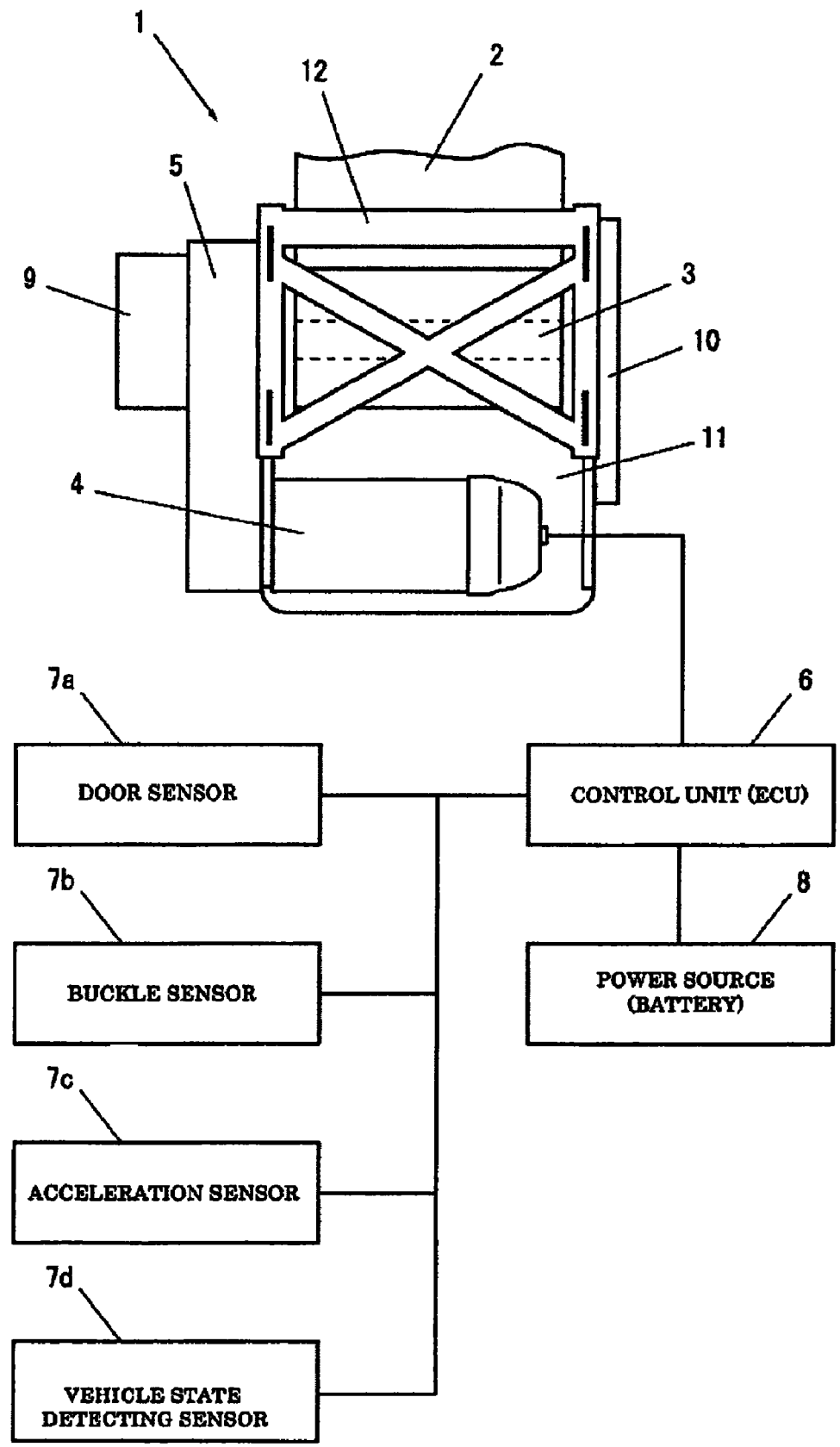
FIG. 1 is a configuration diagram of a motorized retractor according to an exemplary embodiment.
Figure 2:
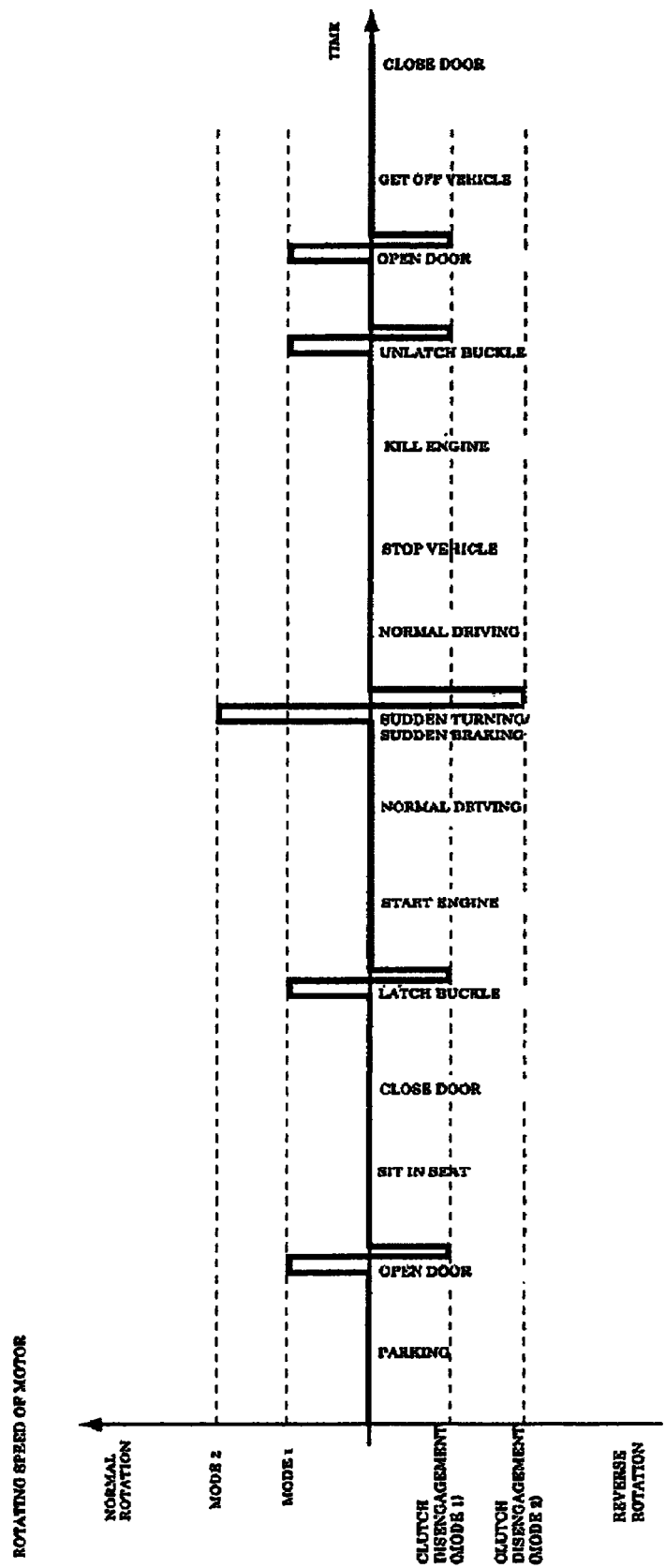
FIG. 2 is a diagram showing an example of the operational conditions of a motor of the motorized retractor of FIG. 1 according to an exemplary embodiment.
Figure 3:
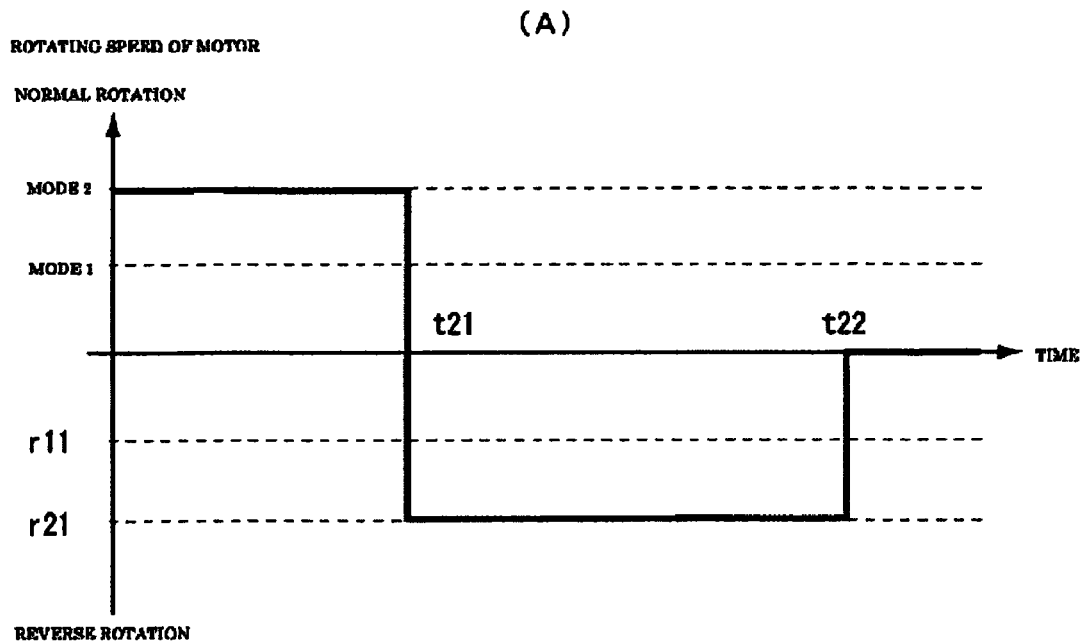
FIG. 3(A) is a diagram showing a relation between the rotating speed of the motor of FIG. 1 and a time of disengagement of the clutch while in a second mode according to an exemplary embodiment.
FIG. 3(B) is a diagram showing a relation between the rotating speed of the motor of FIG. 1 and a time of disengagement of the clutch while in a first mode according to an exemplary embodiment.
Figure 3:
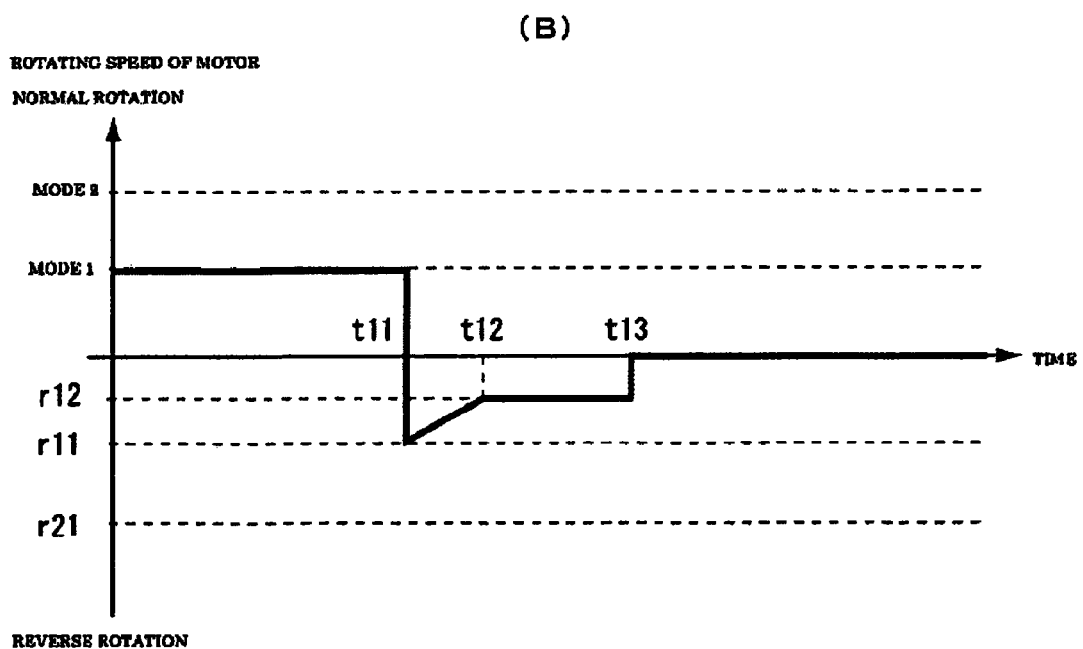
Figure 4:
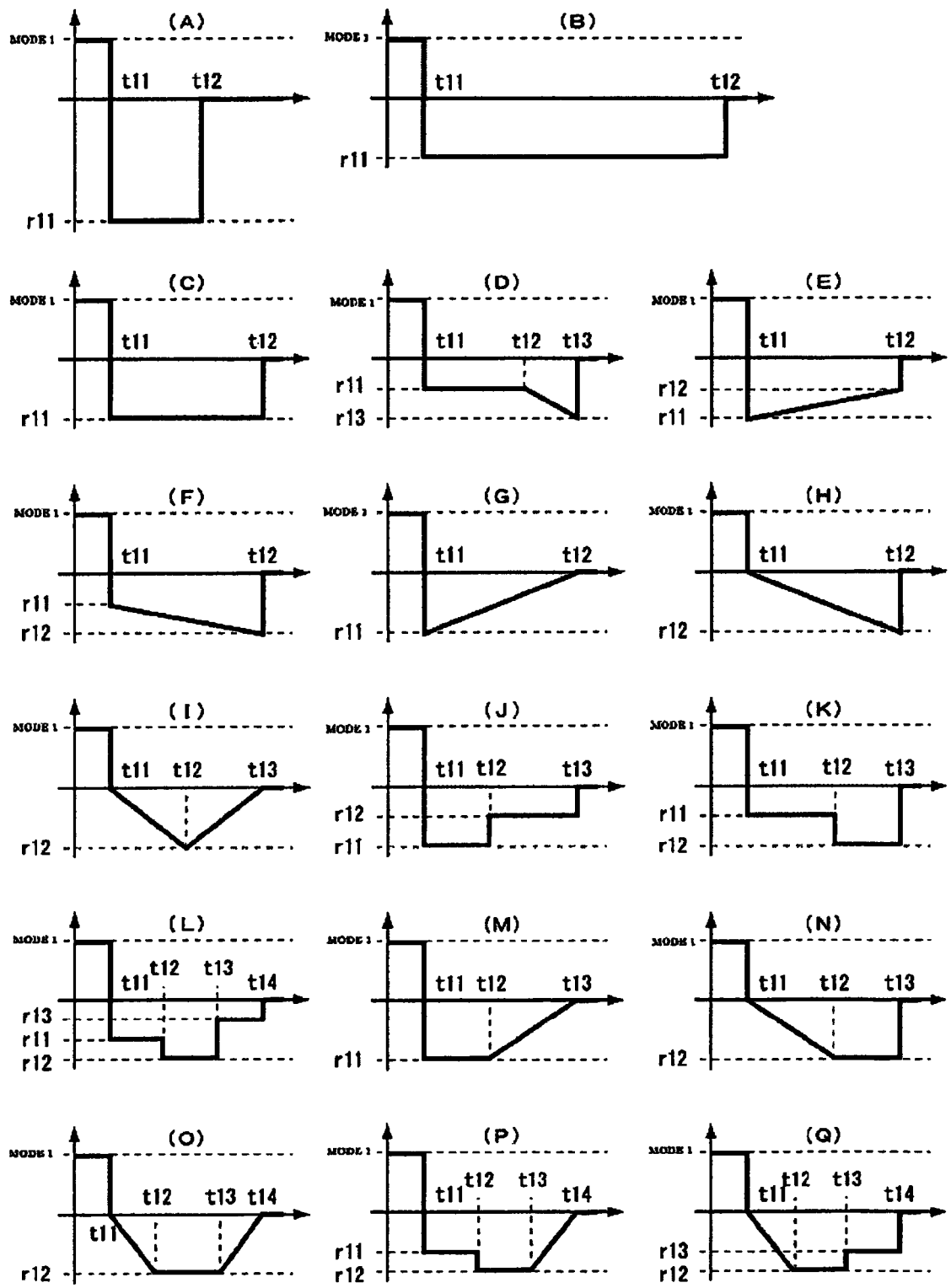
FIGS. 4(A)-4(Q) are diagrams showing a relation between the rotating speed of the motor of FIG. 1 and a time of disengagement of the clutch while in a first mode according to various exemplary embodiments.

Hereinafter, embodiments of the present invention will be described with reference to FIG. 1 through FIG. 5. FIG. 1 is a configuration diagram of a motorized retractor according to one exemplary embodiment and FIG. 2 is a diagram showing example operational conditions of a motor of the motorized retractor.

As shown in FIG. 1, the motorized retractor 1 of the present invention includes a spool 3 onto which a webbing belt 2 for restraining an occupant is wound, a motor 4 that is operated according to predetermined signals, a power transmission 5 having a clutch mechanism enabling transmission of power of the motor 4 to the spool 3, a control unit 6 for controlling the operation of the motor 4, various sensors 7a-7d that are connected to the control unit 6 to output signals for operating the motor 4, and a power source 8 for supplying electric current to the motor 4. According to various exemplary embodiments, the power transmission 5 may be the transmission described in FIGS. 6(A) and 6(B)) or any other power transmission capable of operating the motorized retractor 1.

Disposed on an outer side of the power transmission 5 is, a spring 9 (e.g., a spiral spring) that biases the spool 3 in the winding direction of the webbing belt 2. A lock 10 is connected to an end of the spool 3 opposite the end where the power transmission 5 is located. The lock 10 can prevent the spool 3 from rotating in the direction that the webbing belt 2 withdraws when a large deceleration exceeding a predetermined deceleration value occurs, for example in the event of a vehicle collision. The power source 8 may be a battery mounted on the vehicle.

The spool 3, the motor 4, the power transmission 5, and the lock 10 may be connected to a frame 11 having a U-like section. The frame 11 is provided with a frame cover 12 that is connected to a portion of the frame 11 where the webbing belt 2 is wound to provide adequate space for the thickness of the roll when the webbing belt 2 is fully wound. It should be noted that the motorized retractor 1 may be provided with a pyrotechnic pretensioner that is activated in the event of emergency to wind up the webbing belt 2 to restrain the occupant.

The control unit 6 (e.g., an electronic control unit (ECU)) is connected to the motor 4, a door sensor 7a, a buckle sensor 7b, an acceleration sensor 7c, a vehicle state detecting sensor 7d, and the power source 8, and contains a program for supplying the power of the power source 8 to the motor 4 to operate the motor 4 to rotate in a predetermined sequence according to signals outputted from the respective sensors 7a through 7d. The control unit 6 in the motorized retractor 1 is programmed to change the rotating speed or the driving time period of the motor 4 according to the load on the clutch mechanism when cancelling the power transmission of the clutch mechanism by operating the motor 4 to rotate in the reverse direction.

As shown in FIG. 2, as the control of motorized retractor 1 moves from the parking state through the driving state and back to the parking state, the motor 4 is operated when opening a door, latching a buckle, suddenly turning/suddenly braking, unlatching the buckle, and opening the door again. When opening the door, latching the buckle, and unlatching the buckle, the motor 4 is operated in a first mode (hereinafter, referred to as "mode 1") with a low rotating speed. When suddenly turning or suddenly braking, the motor 4 is operated in a second mode (hereinafter, referred to as "mode 2") with higher rotating speed.

In mode 1, for example, the motor 4 is operated (1) when an occupant opens the door for getting in the parked vehicle, (2) when the occupant puts on and latches the seat belt after getting on the vehicle, (3) when the occupant unlatches and takes off the seat belt after stopping the vehicle, and (4) when the occupant opens the door to get out of the vehicle. In mode 2, for example, the motor 4 is operated when the acceleration sensor 7c detects a sudden deceleration or when the vehicle state detection sensor 7d detects a tilt of the vehicle or abrupt steering (i.e., when suddenly turning/suddenly braking). It should be understood that, in mode 2, the motor 4 may be operated based on signals of a vehicle collision prediction system that includes, for example, a vehicle-mounted radar, a brake sensor, a steering angle sensor, and/or a vehicle speed sensor.

The operation of the motor when an occupant opens a door for getting in a parked vehicle is for removing a slack of the webbing belt 2 caused by to insufficient storage of the webbing belt 2 when an occupant previously got out of the vehicle. The door sensor 7a detects the opening of the door and outputs a signal to the control unit 6.

The operation of the motor when the occupant puts on and latches the seat belt after getting in the vehicle is for removing a slack of the webbing belt 2 relative to the size of the occupant. The buckle sensor 7b detects the latching of the buckle and outputs a signal to the control unit 6.

The operation of the motor when the occupant unlatches and takes off the seat belt after stopping the vehicle is for removing a slack of the webbing belt 2 caused when the webbing belt 2 is stored. The buckle sensor 7b detects the unlatching of the buckle and outputs a signal to the control unit 6.

The operation of the motor when the occupant opens the door to get out of the vehicle is for removing a slack of the webbing belt 2 caused due to insufficient storage of the webbing belt 2 when the occupant put on the seat belt. The door sensor 7a detects opening of the door and outputs a signal to the control unit 6.

For each mode 1 operation, the motor 4 is stopped after the motor 4 is rotated in the reverse direction to disengage the clutch when satisfying any one of the following conditions: after a lapse of a predetermined time period after the motor 4 is rotated in the normal direction at a predetermined rotating speed, when completion of storage of the webbing belt 2 is detected, and when the tension on the webbing belt reaches a predetermined value. Since the main purpose of mode 1 is to remove a slack of the webbing belt 2, as shown in FIG. 2, the rotating speed of the motor 4 in the normal direction may not be as high as the rotating speed in mode 2. As a result, the load on the spool 3 and the clutch mechanism is lower. The operation frequency of mode 1 may also be higher than the operation frequency of mode 2 (when the occupant is in the vehicle). The action of disengaging the clutch in mode 1 reduces the rotating speed of the motor 4 and/or shortens the driving time period of the motor 4.

FIGS. 3(A) and 3(B) are diagrams showing a relation between the rotating speed of the motor and a time of clutch disengagement in each mode. FIG. 3(A) shows the relation between speed and time in mode 2 while FIG. 3(B) shows the relation in mode 1 according to one exemplary embodiment. The ordinate indicates the rotating speed of the motor while the abscissa indicates time. As shown in FIG. 3(A), in mode 2 the motor 4 is rotated in the reverse direction at a rotating speed r21 for a driving time period from t21 to t22 to ensure the disengagement of the clutch. As shown in FIG. 3(B), in mode 1 the motor 4 is rotated in the reverse direction at rotating speeds r11 and r12 (which are lower speeds than r21) for a driving time period from t11 to t13 (which is a shorter time period than from t21 to t22). Since the holding force of the power transmission mechanism is due to the reverse rotation of the motor 4, the motor is first rotated in the reverse direction at the rotating speed r11 and gradually lowered to the rotating speed r12 until the time t12 is reached. The motor 4 is rotated in the reverse direction at the constant rotating speed r12 until it reaches the time t13. When disengaging the clutch in mode 1, the rotating speed of the motor 4 can be lower than in mode 2 to reduce the operating noise of the motor 4. The driving time period of the motor 4 can be shorter than in mode 2 to shorten the time period during which operating noise may be generated from the motor 4.

While FIG. 3(B) illustrates one exemplary embodiment for disengaging the clutch in mode 1, various other exemplary embodiments may be used. FIGS. 4(A)-4(Q) are diagrams each showing a relation between the rotating speed of the motor and time during disengagement of the clutch in mode 1 according to various other exemplary embodiments. In the diagrams of FIGS. 4(A)-4(Q), the ordinate indicates the rotating speed of the motor and the abscissa indicates time.

In the embodiment shown in FIG. 4(A), a rotating speed r11 at the time t11 is equal to the rotating speed r21 for mode 2 and a driving time period from t11 to t12 is shorter than the driving time period from t21 to t22 for mode 2. The driving time period of the motor 4 is shortened, thereby shortening the time period during which the operating noise is generated from the motor 4.

In the embodiment shown in FIG. 4(B) a driving time period from t11 to t12 is equal to the driving time period from t21 to t22 for mode 2 and a rotating speed r11 during the driving time period from t11 to t12 is constant and is lower than the rotating speed r21 for mode 2. The rotating speed of the motor 4 is lowered, thereby reducing the operating noise of the motor 4 itself.

In the embodiment shown in FIG. 4(C) a driving time period from t11 to t12 is shorter than the driving time period from t21 to t22 for mode 2 and the rotating speed r11 is constant and lower than the rotating speed r21 for mode 2. The driving time period of the motor 4 is shortened, thereby shortening the time period during which the operating noise is generated from the motor 4, and the rotating speed of the motor 4 is lowered reducing the operating noise of the motor 4 itself.

In the embodiment shown in FIG. 4(D) the variation in the rotating speed during the driving time period from t11 to t13 of the embodiment shown in FIG. 3(B) is inverted to exchange the anterior half for the posterior half. The motor 4 is rotated in the reverse direction at a constant rotating speed r11 during a time period from time t11 to time t12 and the rotating speed is gradually increased to r13 during a time period from time t12 to time t13. Since smaller operating noise of the motor 4 is better, the first rotating speed r11 is set to be low and the rotating speed of the motor 4 is increased in the posterior half in order to securely disengage the clutch. Alternatively, in the embodiment shown in FIG. 4(F), the rotating speed may be gradually increased to the rotating speed r12 during a driving time period from time t11 to time t12. In the embodiment shown in FIG. 4(H), the rotating speed r11 at the time t11 may be set to be 0 (zero). In the embodiment shown in FIG. 4(K), the rotating speed during a time period from time t11 to time t12 may be set to be constant at a rotating speed r11 and the rotating speed during a time period from time t12 to time t13 may be set to be constant at a rotating speed r12 (which is higher than the rotating speed r11) so that the rotating speed is increased in steps. In the embodiment shown in FIG. 4(N), the rotating speed during a time period from time t11 to time t12 may be gradually increased to the rotating speed r12 and the rotating speed during a time period from time t12 to time t13 may be constant.

In the embodiment shown in FIG. 4(E) the driving time period from t11 to t12 is shorter than the driving time period from t21 to t22 for mode 2, the rotating speed r11 during the driving time period from t11 to t12 is lower than the rotating speed r21 for mode 2, and the rotating speed of the motor 4 is gradually lowered. Although the rotating speed at the time t12 is set to be a rotating speed r12 according to the embodiment of FIG. 4(E), the rotating speed at the time t12 may be set to be 0 (zero) in the embodiment shown in FIG. 4(G). In the embodiment shown in FIG. 4(J), the rotating speed during a time period from time t11 to time t12 may be set to be constant at a rotating speed r11 and the rotating speed during a time period from time t12 to time t13 may be set to be constant at a rotating speed r12 (which is lower than the rotating speed r11) so that the rotating speed is lowered in steps. In the embodiment shown in FIG. 4(M), the rotating speed during a time period from time t11 to time t12 may be constant at a rotating speed r11 and the rotating speed during a time period from time t12 to time t13 may be gradually lowered. In the embodiments of FIG. 4(E), FIG. 4(G), FIG. 4(J), and FIG. 4(M), the rotating speed of the motor is set to be lowered according to the lapse of the driving time reducing the operating noise of the motor 4. The operating noise of the motor 4 can be reduced after the occupant opens the door or after the occupant puts on the seat belt, that is, when the vehicle cabin is under relatively quiet condition, thereby effectively reducing the uncomfortable feeling of the occupant.

In the embodiment shown in FIG. 4(I) the driving time period from t11 to t12 is shorter than the driving time period from t21 to t22 for mode 2, the rotating speed r11 during the driving time period from t11 to t13 is lower than the rotating speed r21 for mode 2, and the rotating speed of the motor 4 is gradually increased during a time period from time t11 to time t12 and is gradually lowered during a time period from time t12 to t13. Though the rotating speed at the time t12 is set to be a rotating speed r12 according to the embodiment of FIG. 4(I), the rotating speed during the time period from time t11 to time t12 may be constant at a rotating speed r11, the rotating speed during the time period from time t12 to time t13 may be constant at a rotating speed r12, and the rotating speed during the time period from time t13 to t14 may be constant at a rotating speed r13 so that the rotation speed becomes highest at the middle in steps, such as in the embodiment shown in FIG. 4(L). Though the rotating speed r11 is set to be higher than the rotating speed r13 according to the embodiment of FIG. 4(L), the rotating speed r11 may be lower than the rotating speed r13. In the embodiment shown in FIG. 4(O), the rotating speed during a time period from time t11 to time 12 may be gradually increased to a rotating speed r12 and the rotating speed during a time period from time t13 to time t14 may be gradually lowered. In the embodiments of Fig. (I), Fig. (L), and Fig. (O), the operating noise of the motor 4 is gradually increased and gradually lowered according to the lapse of the driving time making the operating noise of the motor 4 indiscernible to the occupant.

The embodiment shown in FIG. 4(P) is a combination of the anterior half of the embodiment shown in FIG. 4(L) and the posterior half of the embodiment shown in FIG. 4(O). The rotating speed during a time period from time t11 to time t12 is constant at a rotating speed r11 and the rotating speed during a time period from time t13 to time t14 is gradually lowered from the rotating speed r12. The embodiment shown in FIG. 4(Q) is a combination of the posterior half of the embodiment shown in FIG. 4(L) and the anterior half of the embodiment shown in FIG. 4(O). The rotating speed during a time period from time t11 to time t12 is gradually increased to the rotating speed r12 and the rotating speed during a time period from time t13 to time t14 is constant at a rotating speed r13. In the embodiments of FIG. 4(P) and FIG. 4(Q), the operating noise of the motor 4 is gradually increased and gradually lowered according to the lapse of the driving time making the operating noise of the motor 4 indiscernible for the occupant.

As shown in FIGS. 3(A), 3(B) and FIGS. 4(A)-4(Q), the rotating speed and the driving time period of the motor 4 can be set at various levels and times according to considerations of the rotating speed and the driving time period of the motor, the load on the clutch mechanism, and the operating noise felt by the occupant to achieve an optimum operation control of the motor 4. It is noted that instead of the embodiments shown in FIGS. 4(A)-4(Q), according to other exemplary embodiments, the rotating speed may be varied in a curve for increasing or lowering the rotating speed. According to another exemplary embodiments, the number of steps used to increase or lower the rotating speed may be increased.

For each action in mode 1 that is shown in FIG. 2, the rotating speed and the driving time period of the motor 4 may be changed. For example, at the time of opening the door before getting out of the vehicle, the rotating speed of the motor 4 may be set to increase in a posterior half of the driving time period to reduce the operating noise of the motor 4 felt by the occupant. At the time of opening the door before getting in the vehicle, the rotating speed of the motor 4 may be set to be higher in an anterior half of the driving time period so to reduce the operating noise of the motor 4 felt by the occupant.

While the rotating speeds and the driving time period of the motor 4 for disengaging the clutch in mode 1 may be embodied as machine or computer code into a program stored in the control unit 6, according to other exemplary embodiments, a threshold value may be set between the rotating speed in mode 1 and the rotating speed in mode 2 before disengagement of the clutch. The disengagement of the clutch as shown in FIG. 3(A) may be conducted when the rotating speed before the disengagement of the clutch is higher than the threshold value. The disengagement of the clutch as shown in FIG. 3(B) or FIG. 4(A)-4(Q) may be conducted when the rotating speed before the disengagement of the clutch is lower than the threshold value. Alternatively, a tension detection sensor for detecting tension on the webbing belt 2 may be used. In this case, the disengagement of the clutch as shown in FIG. 3(A) is conducted when the output of the tension detection sensor is higher than a predetermined threshold value, and the disengagement of the clutch as shown in FIG. 3(B) or FIG. 4(A)-4(Q) is conducted when the output of the tension detection sensor is lower than the predetermined threshold value.

Figure 5:
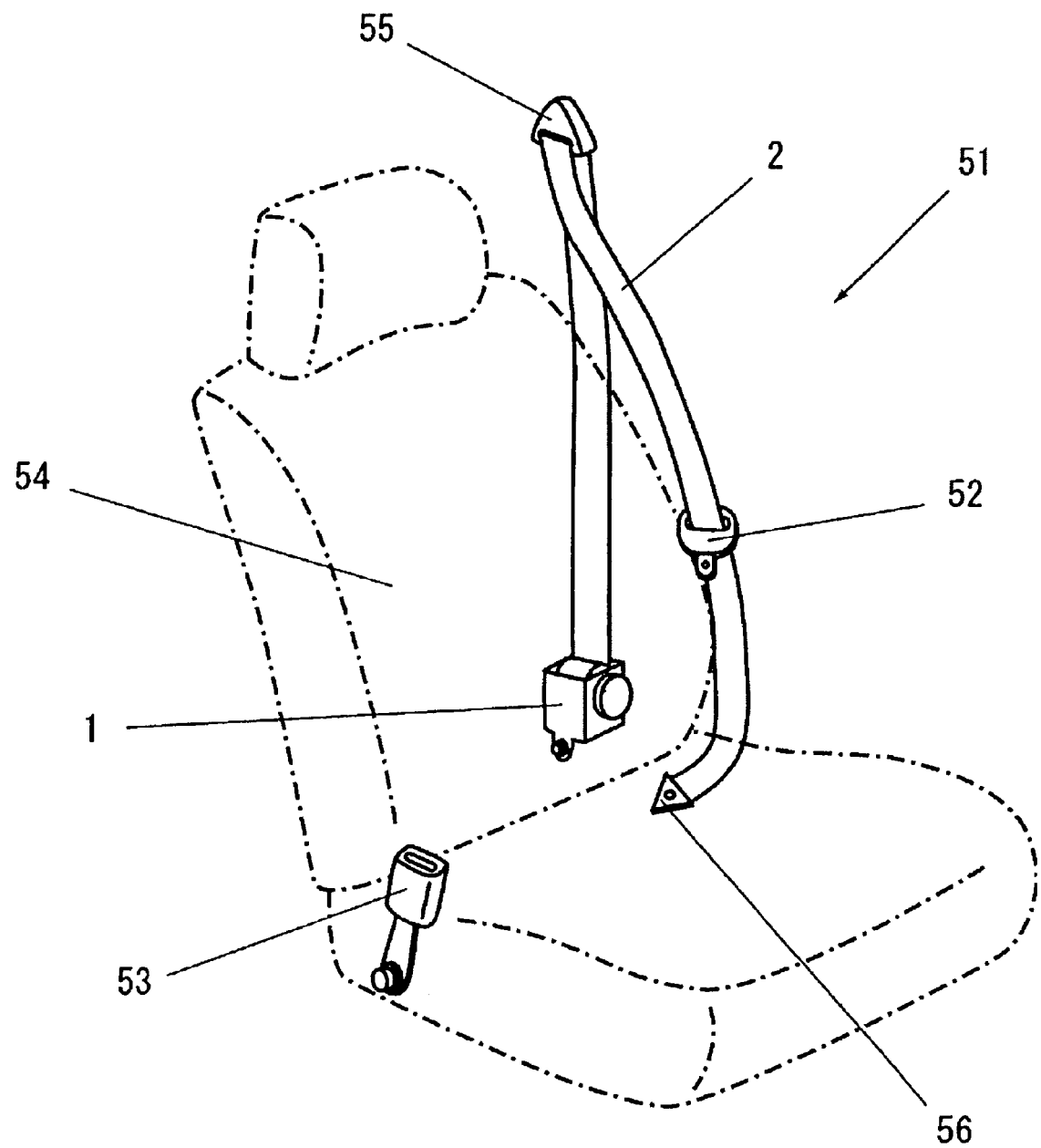
FIG. 5 is a schematic view showing a seat belt apparatus including the motorized retractor of FIG. 1 according to an exemplary embodiment.

FIG. 5 is a schematic overall view showing a seat belt apparatus according to an exemplary embodiment. The seat belt apparatus 51 includes a webbing belt 2 for restraining an occupant, a motorized retractor for winding the webbing belt 2 so it is allowed to be withdrawn, a tongue 52 slidably supported by the webbing belt 2, and a buckle 53 capable of latching with the tongue 52. The motorized retractor may be the motorized retractor 1 shown in FIG. 1 and include a spool 3 onto which the webbing belt 2 is wound, a motor 4 which is operated according to predetermined signals, a power transmission 5 having a clutch mechanism enabling transmission of power of the motor 4 to the spool 3, a control unit 6 for controlling the operation of the motor 4, various sensors 7a-7d which are connected to the control unit 6 to output signals for operating the motor 4, and a power source 8 for supplying electric current to the motor 4. The control unit 6 is programmed to control the rotating speed and the driving time period of the motor 4 to disengage the clutch mechanism of the power transmission 5. Details of the motorized retractor 1 and the method for controlling it have been described in detail above. It should be noted that the motorized retractor 1 may be located in a vehicle seat 54 and the webbing belt 2 may be hung by a deflection fitting 55 fixed to a vehicle body (not shown) and connected at its end to the vehicle body or the vehicle seat 54 by a belt anchor 56.

The seat belt apparatus 51 includes the motorized retractor 1 to reduced operating noise of the motor 4. The installation locations and specific configurations of the webbing belt 2, the tongue 52, the buckle 53, the vehicle seat 54, the deflection fitting 55, and the belt anchor 56 are not limited to the illustrated embodiments and may be in any location or configuration capable of reducing operating noise.

The Japanese priority application JP 2007-014369, filed Jan. 24, 2007, including the specification, drawings, claims and abstract, is incorporated herein by reference in its entirety.

The present invention is not limited to the aforementioned embodiments. For example, the behavior of the motor in mode 1 is not limited to the exemplary embodiment shown in FIG. 2. It should be understood that various changes could be made without departing from the scope of the invention.

What is claimed is:

1. A method of controlling a motorized retractor that includes a spool onto which a webbing belt for restraining an occupant is wound; a motor operated according to a predetermined signal; and a clutch mechanism enabling transmission of power from said motor to said spool; wherein the method comprises the steps of:
   operating the motor to cancel power transmission of said clutch mechanism; and
   varying the rotating speed or the driving time period of said motor according to the load on said clutch mechanism during the cancelling step.

2. The method of claim 1, wherein if the load on said clutch mechanism is lower than a predetermined value, the rotating speed of said motor is lower than if the load on said clutch mechanism is higher than the predetermined value.

3. The method of claim 2, wherein if the load on said clutch mechanism is lower than the predetermined value, the method is in a first mode for operating said motor to remove a slack of said webbing belt and if the load on said clutch mechanism is higher than the predetermined value, the method is in a second mode for operating said motor to restrain an occupant in the event of an emergency.

4. The method of claim 3, wherein the rotating speed of said motor is varied gradually, varied in steps, or varied gradually and in steps.

5. The method of claim 2, wherein the rotating speed of said motor is varied gradually, varied in steps, or varied gradually and in steps.

6. The method of claim 1, wherein if the load on said clutch mechanism is lower than a predetermined value, the driving time period of said motor is shorter than if the load on said clutch mechanism is higher than the predetermined value.

7. The method of claim 6, wherein if the load on said clutch mechanism is lower than the predetermined value, the method is in a first mode for operating said motor to remove a slack of said webbing belt and if the load on said clutch mechanism is higher than the predetermined value, the method is in a second mode for operating said motor to restrain an occupant in the event of an emergency such as sudden turning or sudden braking.

8. The method of claim 6, wherein the rotating speed of said motor is varied gradually, varied in steps, or varied gradually and in steps.

9. The method of claim 1, wherein if the load on said clutch mechanism is lower than a predetermined value, the rotating speed of said motor is lower and the driving time period of said motor is shorter than if the load on said clutch mechanism is higher than the predetermined value.

10. The method of claim 9, wherein if the load on said clutch mechanism is lower than the predetermined value, the method is in a first mode for operating said motor to remove a slack of said webbing belt and if the load on said clutch mechanism is higher than the predetermined value, the method is in a second mode for operating said motor to restrain an occupant in the event of an emergency such as sudden turning or sudden braking.

11. The method of claim 9, wherein the rotating speed of said motor is varied gradually, varied in steps, or varied gradually and in steps.

12. The method of claim 1, wherein the rotating speed of said motor is varied gradually, varied in steps, or varied gradually and in steps.

13. A motorized retractor comprising:
   a spool onto which a webbing belt for restraining an occupant is wound;
   a motor operated according to a predetermined signal;
   a clutch mechanism enabling transmission of power from said motor to said spool; and
   a control unit for controlling the operation of said motor;
   wherein said control unit is configured so that when cancelling power transmission of said clutch mechanism by the operation of said motor, the rotating speed and/or the driving time period of said motor are varied according to the load acting on said clutch mechanism.

14. The retractor of claim 13, wherein the control unit is configured so that the rotating speed of said motor is varied gradually, varied in steps, or varied gradually and in steps.

15. The retractor of claim 13, wherein the control unit is configured so that if the load on said clutch mechanism is lower than the predetermined value, the control unit is in a first mode for operating said motor to remove a slack of said webbing belt and if the load on said clutch mechanism is higher than the predetermined value, the control unit is in a second mode for operating said motor to restrain an occupant in the event of an emergency.

16. The retractor of claim 13, wherein the control unit is configured so that if the load on said clutch mechanism is lower than a predetermined value, the rotating speed of said motor is lower and the driving time period of said motor is shorter than if the load on said clutch mechanism is higher than the predetermined value.

17. A seat belt apparatus comprising:
   a webbing belt for restraining an occupant;
   a tongue slidably supported by said webbing belt; and
   a buckle fixed to a vehicle body portion and capable of latching with said tongue;
   a motorized retractor for winding said webbing belt such that said webbing belt is capable of being withdrawn; and
   wherein the motorized retractor includes:
      a spool onto which a webbing belt for restraining an occupant is wound;
      a motor operated according to a predetermined signal;
      a clutch mechanism enabling transmission of power from said motor to said spool; and
      a control unit for controlling the operation of said motor;
      wherein said control unit is configured so that when cancelling power transmission of said clutch mechanism by the operation of said motor, the rotating speed and/or the driving time period of said motor are varied according to the load acting on said clutch mechanism.

18. The apparatus of claim 17, wherein the control unit is configured so that the rotating speed of said motor is varied gradually, varied in steps, or varied gradually and in steps.

19. The apparatus of claim 17, wherein the control unit is configured so that if the load on said clutch mechanism is lower than the predetermined value, the control unit is in a first mode for operating said motor to remove a slack of said webbing belt and if the load on said clutch mechanism is higher than the predetermined value, the control unit is in a second mode for operating said motor to restrain an occupant in the event of an emergency.

20. The apparatus of claim 17, wherein the control unit is configured so that if the load on said clutch mechanism is lower than a predetermined value, the rotating speed of said motor is lower and the driving time period of said motor is shorter than if the load on said clutch mechanism is higher than the predetermined value.

* * * * *